United States Patent

[11] 3,613,070

| [72] | Inventors | Durward B. Jones;<br>William C. Hall, both of Houston, Tex. |
|---|---|---|
| [21] | Appl. No. | 841,207 |
| [22] | Filed | July 14, 1969 |
| [45] | Patented | Oct. 12, 1971 |
| [73] | Assignee | Offshore Systems Inc.<br>Houston, Tex. |

[54] CONTROL SYSTEM FOR UNDERWATER VALVE
20 Claims, 2 Drawing Figs.

[52] U.S. Cl. .................................................. 340/5 R,
251/30, 251/131, 340/16 C
[51] Int. Cl. ....................................................... H04b 11/00
[50] Field of Search ........................................... 340/5, 16r
251/30, 131

[56] References Cited
UNITED STATES PATENTS

| 3,126,559 | 3/1964 | Alexander.................. | 9/10 |
| 3,293,676 | 12/1966 | Link......................... | 340/16 X |
| 3,372,899 | 3/1968 | McPherson................ | 251/30 X |
| 3,405,387 | 10/1968 | Koomey et al............. | 340/5 |
| 3,434,690 | 3/1969 | Troncale, Sr. ............. | 251/30 |

Primary Examiner—Richard A. Farley
Attorneys—John A. Crowley, Jr and Alvin H. Fritschler ABSTRACT: There is provided a control system for remotely opening or closing flow lines, for example oil wells.

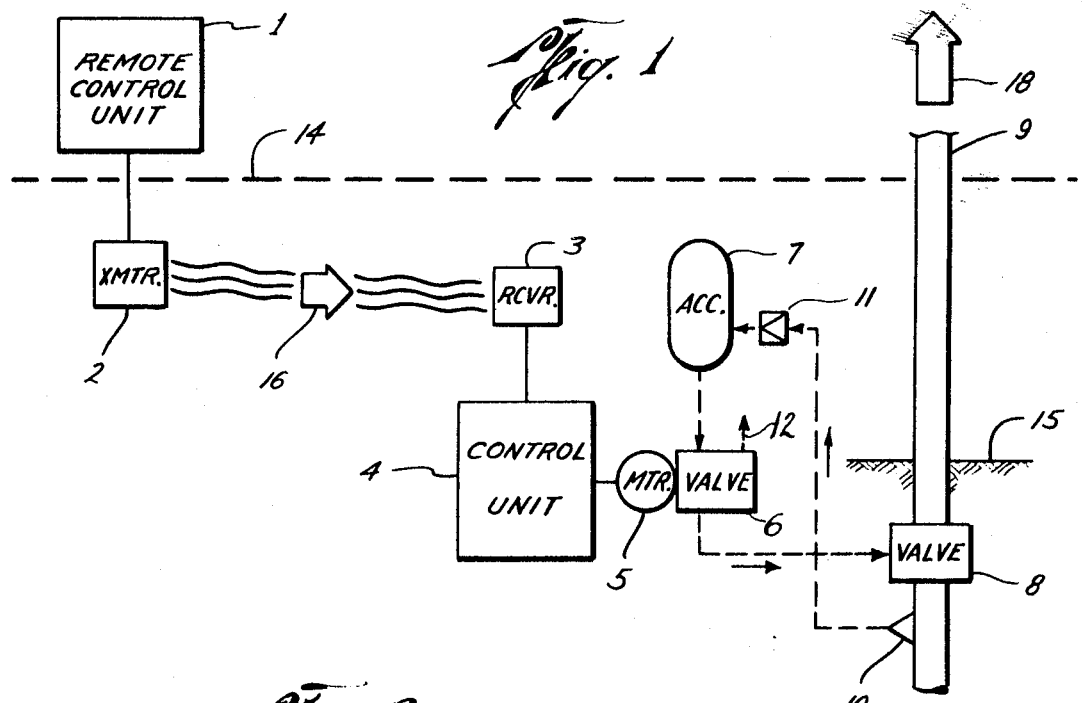
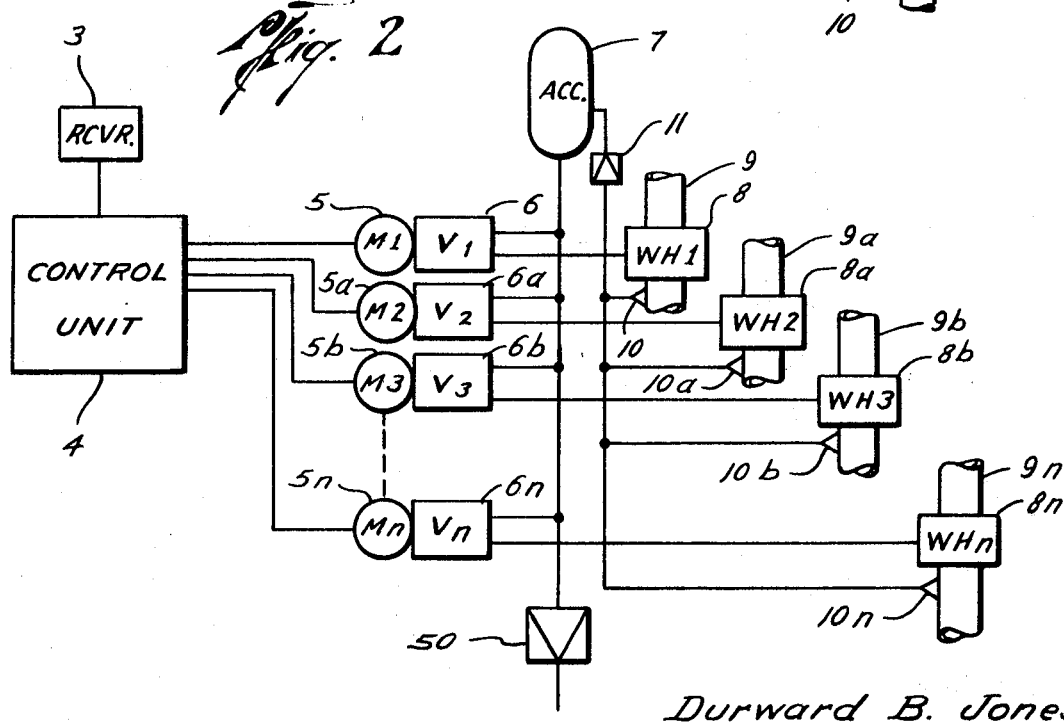
Durward B. Jones
William C. Hall
INVENTORS
BY *G. Donald Weber Jr.*
ATTORNEY

CONTROL SYSTEM FOR UNDERWATER VALVE

BACKGROUND

In the petroleum industry, the raw petroleum is usually extracted from a subterranean reservoir by means of wells. The wells often extend to great depths and the raw petroleum is usually extracted from the reservoir under great pressure. The pressure may be natural or induced. In addition, petroleum has potential dangers such as being inflammable, noxious, causing pollution or the like. Consequently, it is highly desirable to be able to "shut down" a producing well easily and safely.

At present, valves are available for closing the wells when necessary. However, many of these valves require manual control. Frequently, manual control is not possible. For example, considering a petroleum product well, a fire at the well site would render manual operation of the isolating valve extremely hazardous. As another example, an underwater well may be inaccessible either as a consequence of water depth or as a result of the lack of diving equipment and/or personnel at the well site.

The traditional safely valves (such as storm chokes or the like), fall into two categories. These safety valves either depend upon a high flow rate, high pressure or high-pressure drop for actuation, or they require the manual regulation of a control pressure. The first, or "automatic" type safety valve is frequently proven unreliable. The second category of safety valve requires access to a manual control device which is adjacent the danger area.

In order to provide safe and reliable control over flow lines, wells or the like, it is desirable to use a remote control unit. The remote unit can be linked to the control valve by a suitable interface. For example, the remote control station can be hardwired directly to the controlled elements. Alternatively, the remote control station may be wirelessly linked to the controlled elements. Thus, acoustic control is effected. The acoustic link has an advantage over a hardline cable in that it avoids the need for a continuous physical line to the control point.

PRIOR ART

Some related art is shown in U.S. Pat. No. 3,405,387, entitled Acoustical Underwater Control Apparatus, by Koomey et al. and assigned to the assignee of this invention. The noted patent and divisional applications thereof disclose acoustically controlled systems for underwater wells. However, this invention is directed to the concept of closing a flow line in emergency conditions to avoid large "spills" of petroleum or to stop petroleum flow in the event of a fire, blowout, or the like.

SUMMARY OF THE INVENTION

The invention relates to a gas or fluid controlled valve which is included in a flow line. Typically, the valve may be located at or below the mudline in an underwater petroleum well. The valve is normally in the open position so that the petroleum can pass therethrough. A control unit is directly connected to the valve to selectively control the fluid which is supplied thereto for operating the valve. The control unit receives control signals from a remote source through a suitable link or interface, such as acoustic signals, hardwire or the like. The control signals cause the valve to close upon command, as for example in the event of an emergency condition, and cause the valve to reopen when the emergency condition is terminated. With this system, it is unnecessary for human operators to be exposed to the dangers caused by the emergency condition in the immediate vicinity of the wellhead.

Thus, one object of this invention is to provide an inherently safe control system.

Another object of this invention is to produce an emergency control system which is operated from a location remote to the emergency area.

Another object of this invention is to provide a relatively simple emergency control system which comprises readily available and known components arranged in a unique combination.

DESCRIPTION OF DRAWINGS

The above objects and advantages, as well as others, will be readily discerned when the following description is read in conjunction with the accompanying drawing in which:

FIG. 1 is a partly schematic, partly diagrammatic showing of the system of the invention; and FIG. 2 is a partly schematic, partly diagrammatic showing of the system for controlling multiple wells.

DESCRIPTION OF PREFERRED EMBODIMENT

Referring to FIG. 1, a suitable remote control unit 1 is provided, Remote control unit 1 is connected to transmitter 2. In the embodiment shown and described, an underwater application is considered. Consequently, transmitter 2, shown below the water surface 14, is a transmitter which operates underwater. Transmitter 2 produces signals, represented by arrow 16, which are transmitted to a suitable receiver. Signals 16 are encoded according to a predetermined coding scheme and produced by remote control unit 1. The signals may be FM, FSK or other suitable signals.

Receiver 3 is connected to control unit 4. Again, receiver 3 is a device, such as a hydrophone, which is capable of operating underwater. Control unit 4 includes logic circuitry, decoding networks and the like for selectively operating upon the signals detected by receiver 3. When the signals are decoded, a suitable signal is supplied from control unit 4 to driver 5 to cause operation thereof. Driver 5 may be a motor, solenoid or the like.

Driver 5 is connected to valve 6 which is used as a directional valve. The position of the porting in valve 6 is controlled by driver 5. Thus, fluid flow through valve 6 is controlled as a function of the signals received at receiver 3.

A suitable valve 8 is connected in line with flow line 9. Only a section of flow line 9 is illustrated for convenience. Flow line 9 represents any type of petroleum well, such as an oil well or a gas well. Typically, valve 8 is located at or below the ground or mud line 15 of the well. Valve 8 may be, for example, a Page Sub-Sea Safety Valve, several of which are manufactured by Page Oil Tools, Inc.

Accumulator 7 is, preferably, a pressurized unit which supplies control fluid to valve 8 via valve 6. In one configuration, application of pressurized fluid from accumulator 7 to valve 8 causes valve 8 to remain open whereby the petrochemical (or the like) can pass therethrough in the direction indicated by arrow 18.

Tap 10 is shown adjacent to flow line 9 but upstream from valve 8. Thus, tap 10 is adapted to extract higher pressure fluid in flow line 9 regardless of the position of valve 8. That is, if valve 8 is closed, the fluid pressure upstream of flow line 9 is, obviously, greater than the fluid pressure downstream of valve 8. If, on the other hand, valve 8 is open, little or no pressure differential is detected between tap 10 and valve 8 and a condition of equilibrium exists.

Tap 10 is connected to accumulator 7 via check valve 11. Check valve 11 permits fluid flow therethrough, in one direction only, and only so long as a prescribed pressure differential exists thereacross. This connection permits accumulator 7 to be recharged and, therefore, be prepared to exert pressure upon valve 8 when desired.

In operation, it is assumed, initially, that value 6 is in the open condition such that pressurized fluid flows therethrough. The pressurized fluid is provided by accumulator 7. Accumulator 7 has been pressurized by an initial charge placed therein by means of pressurized gas or via the recharge path through check valve 11. The pressurized fluid, after passing through valve 6, is supplied to valve 8 and, as is known, maintains valve 8 in the open position such that flow line 9 is operative.

Fluid pressure in flow line 9 is "tapped off" at tap 10 and supplied to accumulator 7 via the recharge path. Pressure equilibrium in accumulator 7 and across check valve 11 is quickly established. Thus, a substantially self-sustaining closed-loop system is effected and valve 8 is maintained open. In this condition, fluid flows through flow line 9 and normal operation prevails.

If, now, an emergency condition arises, it may be necessary that flow line 9 be closed to prevent production therethrough. For example, in underwater operations, a storm may displace a surface rig or perhaps a surface vessel may strike the wellhead equipment and damage same. In land (or underwater) operations, a fire may develop at the wellhead. In such cases, it may be difficult, or even impossible, to approach the wellhead, with safety, to manually close control valves. Thus, this system becomes highly desirable and useful.

That is, the operator merely effects an appropriate action at remote control unit 1. This action may be closing a switch or the like. This operation activates circuitry which produces a properly coded signal which represents only the well in question. This encoded signal is applied to transmitter 2. Transmitter 2 produces a suitable signal, acoustic or the like, which is transmitted to receiver 3 as indicated by arrow 16. In the preferred embodiment, the acoustic signal is transmitted by the medium (such as water). In the alternative, a hardline connection may be made between remote control unit 1 and control unit 4. However, hardline connections are inflexible in location, quite expensive and subject to deterioration.

The coded signal is received by receiver 3 which transmits same to control unit 4. Control unit 4, as noted, includes suitable decoding networks to decode the signals from receiver 3. Of course, control unit 4 includes a suitable power source for energizing the circuits in the unit. The decoding networks in control unit 4 produce a control signal in response to actuation by the proper coded signal. The control signal is supplied to motor 5 to cause operation thereof. Motor 5 is coupled to valve 6 in order to control the position thereof. For example, motor 5 drives valve 6 to the closed position thereby interrupting the flow of pressurized fluid from accumulator 7 to valve 8 and venting valve 6 via vent 12. Consequently, valve 8, when pressurized fluid is removed, moves to the closed position, for example, as a result of a spring-biased mechanism.

When valve 8 is closed, petroleum flow beyond valve 8 in flow line 9 is terminated. However, pressurized fluid (for example gas) is transmitted to accumulator 7 via check valve 11. This pressurized fluid is obtained at tap 10 upstream of valve 8. Thus, accumulator 7 is recharged (i.e. pressurized) for the next operation since check valve 11 prevents the pressurized fluid from venting to line 9.

Referring now to FIG. 2, there is shown the controlled portion of a multiple-well control system. In FIG, 2, similar reference numerals are applied to components which are similar to those shown in FIG. 1. Thus, receiver 3 is any suitable device for receiving signals from the transmitter (not shown). Receiver 3 is connected to control unit 4 which operates upon signals received by receiver 3. Control unit 4 includes logic circuitry and decoding circuitry for detecting the information content of the signals. That is, the signals received at receiver 3 will have a coded arrangement so that any of $n$ (where $n$ is an integer) wells or flow lines 9–9$n$ can be individually (or collectively) operated.

Suitable circuitry is known whereby the coded signals can be decoded and an appropriate output signal produced and supplied to drivers 5–5$n$, selectively. These drivers are connected to drive valves 6–6$n$. Valves 6–6$n$ are connected in parallel to each other and in series between accumulator 7 and control valves 8–8$n$. Control valves 8–8$n$ are "in line" with flow lines 9–9$n$ to control flow therethrough. Taps 10–10$n$ are connected to flow lines 9–9$n$, below the control valves, and returned to accumulator 7 via check valve 11. In addition, taps 10–10$n$ should include check valves to avoid any interaction between flow lines. In some cases, it may be permissible to omit check valve 11.

The operation of the multiple control system is similar to the individual system shown and described in FIG. 1. Thus, the operator will activate control unit 1 (FIG. 1) as, for example, by operating a switch or the like, In particular, the operator will activate a particular network which is associated with a predetermined valve 8–8$n$. A specific code signal (or signals) will be generated by control unit 1 and produced by transmitter 2. The signals will be received by receiver 3 and operated upon by control unit 4. The proper output signal will be generated by control unit 4 and applied to the appropriate motor 5–5$n$. Operation of the motor will effect closure of the appropriate valve 6–6$n$, thereby effectively disconnecting accumulator 7 from the associated control valve 8–8$n$. When the control valve is disconnected from accumulator 7, the control valve will close and one of flow lines 9–9$n$ will be closed. Accumulator 7 is continuously recharged via the recharging lines connected to taps 10–10$n$. A relief check valve 50 is provided so that accumulator 7 can be vented to prohibit the buildup of excessive pressure in the event that all of the valves 6–6$n$ are closed concurrently.

Of course, when the emergency condition abates, the operator will reverse the operation by means of a suitable control at remote control unit 1 (FIG. 1). Thus, any valves 6–6$n$ which had been closed can be opened and normal operation can proceed.

Thus, it is seen that there is provided a system for remotely and safely controlling flow in a flow line. Having described a preferred embodiment what is claimed is:

1. A system for the control of the flow of fluid in a flow line comprising:
    a. a fluid actuated flow control valve positioned in a fluid flow line;
    b. a fluid energy accumulator means;
    c. conduit means between said accumulator means and said flow control valve for supplying fluid from said accumulator means to said flow control valve for actuation thereof;
    d. tap means positioned upstream from said fluid control valve for extracting pressurized fluid from said flow line for passage to said accumulator means;
    e. conduit means between said tap means and said accumulator means for supplying pressurized fluid from the flow line to said accumulator means;
    f. directional valve means positioned in said conduit means between said accumulator means and said flow control valve for controlling the flow of fluid therein to said flow control valve;
    g. driving means for controlling the operation of said directional valve means;
    h. electrical control means for selectively controlling the operation of said driving means, said control means including an electrical power source for energizing said control means,
    whereby the directional valve means is operated by said control means so as to control the flow of fluid from the accumulator means to said flow control valve, thereby controlling the position of said control valve and the flow of fluid in the flow line, the fluid energy in said accumulator means resulting from the tapping of fluid in said flow line upstream from the flow control valve, obviating the necessity for employing a pump and driving motor for pumping fluid from the accumulator means to said flow control valve, thereby minimizing the power requirements for energizing the control circuits of said system.

2. The apparatus of claim 1 and including a check valve in said conduit means between said tap means and said accumulator means for preventing venting of pressurized fluid from said accumulator means to said flow line.

3. The apparatus of claim 1 in which said fluid actuated flow control valve comprises a hydraulically actuated flow control valve positioned in a hydraulic flow line, said fluid energy accumulator means comprising a hydraulic energy accumulator means, said conduit means both supplying hydraulic fluid therein, said directional valve means controlling the flow of hydraulic fluid, said system controlling the flow of hydraulic fluid in a flow line.

4. The apparatus of claim 3 and including a check valve in said conduit means between said tap means and said accumulator means for preventing venting of pressurized fluid from said accumulator means to said flow line.

5. The apparatus of claim 1 and including signal means for selectively actuating said electrical control means.

6. The apparatus of claim 3 and including signal means for selectively actuating said electrical control means.

7. The process of claim 6 in which said signal means comprises coded signal means having a preselected code format and said control means includes decoding means for operating upon coded signals to produce an output signal in response to such coded signal.

8. The apparatus of claim 7 in which said signal means is located at a source remote from said control means, said control means including signal receiving means adapted for detecting signals from a remote source, said signal receiving means being connected to said decoding means for supplying detected signals thereto for decoding.

9. The apparatus of claim 8 in which said remotely located signal means is adapted for transmitting said signal to said control means wirelessly through the intermediate medium between said signal means and said control means.

10. The apparatus of claim 9 in which said signal means comprises acoustic signal means.

11. The apparatus of claim 10 in which said flow line extends underwater and said hydraulically actuated valve is positioned below the water surface.

12. The apparatus of claim 11 in which said flow line comprises a flow line from an underwater petrochemical well and said hydraulically actuated valve is disposed at the ground line, said remotely located signal means comprising acoustic signal means located at the water surface remotely from said flow line, the acoustic signals from said remotely located signal means being transmitted by the water to the electrical control means located underwater for control of the underwater hydraulically actuated flow control valve.

13. The apparatus of claim 12 in which said hydraulically actuated valve is located below the ground level of said petrochemical well.

14. The apparatus of claim 9 and including a check valve in said conduit means between said tap means and said accumulator means for preventing venting of pressurized fluid from said accumulator means to said flow line.

15. The apparatus of claim 9 in which said hydraulically actuated valve comprises a spring-biased, normally closed valve adapted to open and to remain open upon passage of pressurized fluid from said accumulator means through said directional valve means to said hydraulically actuated valve in response to appropriate control signals that said flow line be maintained open, said normally closed fluid control valve moving to a closed position upon closing of said directional valve means so as to interrupt the flow of fluid from said accumulator means to said fluid control valve in response to appropriate control signals that said flow line be closed.

16. The apparatus of claim 9 in which a plurality of flow lines are to be controlled and including:
   a. fluid actuated control valves positioned in each said flow line;
   b. conduit means between said fluid energy accumulator means and each of said flow control valves;
   c. tap means positioned upstream from each of said fluid control valves for extracting pressurized fluid from each of said flow lines for passage to said accumulator means;
   d. conduit means between each of said tap means and said accumulator means,
   e. directional valve means positioned in each of said conduit means between said accumulator means and each of said flow control valves;
   f. driving means for controlling the operation of each of said directional valve means,
   said electrical control means being adapted for selectively controlling the operation of each of said driving means, said remotely located signal means being adapted for transmitting signals to said control means for selectively actuating said control means for control of each of said driving means.

17. The apparatus of claim 16 and including a check valve in said conduit means between said tap means and said accumulator means for preventing venting of pressurized fluid from said accumulator means to any of said flow lines.

18. The apparatus of claim 17 in which said signal means comprises acoustic signal means.

19. The apparatus of claim 18 in which said flow lines extend underwater and said flow control valves are positioned below the water surface.

20. The apparatus of claim 19 in which said remotely located signal means are located at the water surface, the acoustic signals therefrom being transmitted by the water to the electrical control means located underwater for control of said underwater flow control valves.